United States Patent [19]

Engle

[11] Patent Number: 5,746,293

[45] Date of Patent: May 5, 1998

[54] PNEUMATIC PRESSURE TO HYDRAULIC PRESSURE INTENSIFIER MECHANISM

[75] Inventor: Thomas H. Engle, Clayton, N.Y.

[73] Assignee: Westinghouse Air Brake Company, Wilmerding, Pa.

[21] Appl. No.: 691,526

[22] Filed: Aug. 2, 1996

[51] Int. Cl.$^6$ .......................... B60T 11/10; F15B 21/04
[52] U.S. Cl. .......................... 188/151 R; 188/358; 303/2; 91/4 R
[58] Field of Search .......................... 303/2; 188/106 P, 188/355, 358, 151 R; 91/4 R, 535

[56] References Cited

U.S. PATENT DOCUMENTS

| | | | |
|---|---|---|---|
| 3,905,651 | 9/1975 | Hornung | 303/2 |
| 3,957,313 | 5/1976 | Doversberger | 303/2 |
| 4,345,672 | 8/1982 | Nakasu | 188/1.11 WE |
| 4,976,190 | 12/1990 | Cooney | 91/535 |

*Primary Examiner*—Peter M. Poon
*Attorney, Agent, or Firm*—James Ray & Associates

[57] ABSTRACT

A pneumatic/hydraulic pressure intensifier has a cap secured to open end of housing. A first chamber in open end receives air pressure. A first fluid communication system formed in cap communicates air pressure to first chamber. A wall member is disposed in such housing. A second chamber in communication with first chamber contains hydraulic fluid and unpressurized air. A second cap is secured to other end of housing. A third chamber in intensifier contains hydraulic fluid. A second fluid communication system formed in second cap connects the third chamber to a fluid communication line. An aperture formed in wall of second chamber evacuates air from portion of first and second chambers upon communication of air to a second portion of first chamber and communication of air to the first and second chambers upon evacuation of air pressure. A second aperture, formed in another housing wall, communicates hydraulic fluid to second chamber. A first piston is disposed for reciprocal movement in the first chamber. First piston is sealed against wall of first chamber to retain pressure in first chamber. A second piston moves in reciprocal manner in such third chamber. Second piston is sealed against wall of third chamber to communicate hydraulic fluid to a communication line. A rod is connected at first and second ends thereof to the first and second pistons to move them down on communication of air to first chamber. A spring moves pistons toward first cap when air is evacuated.

20 Claims, 1 Drawing Sheet

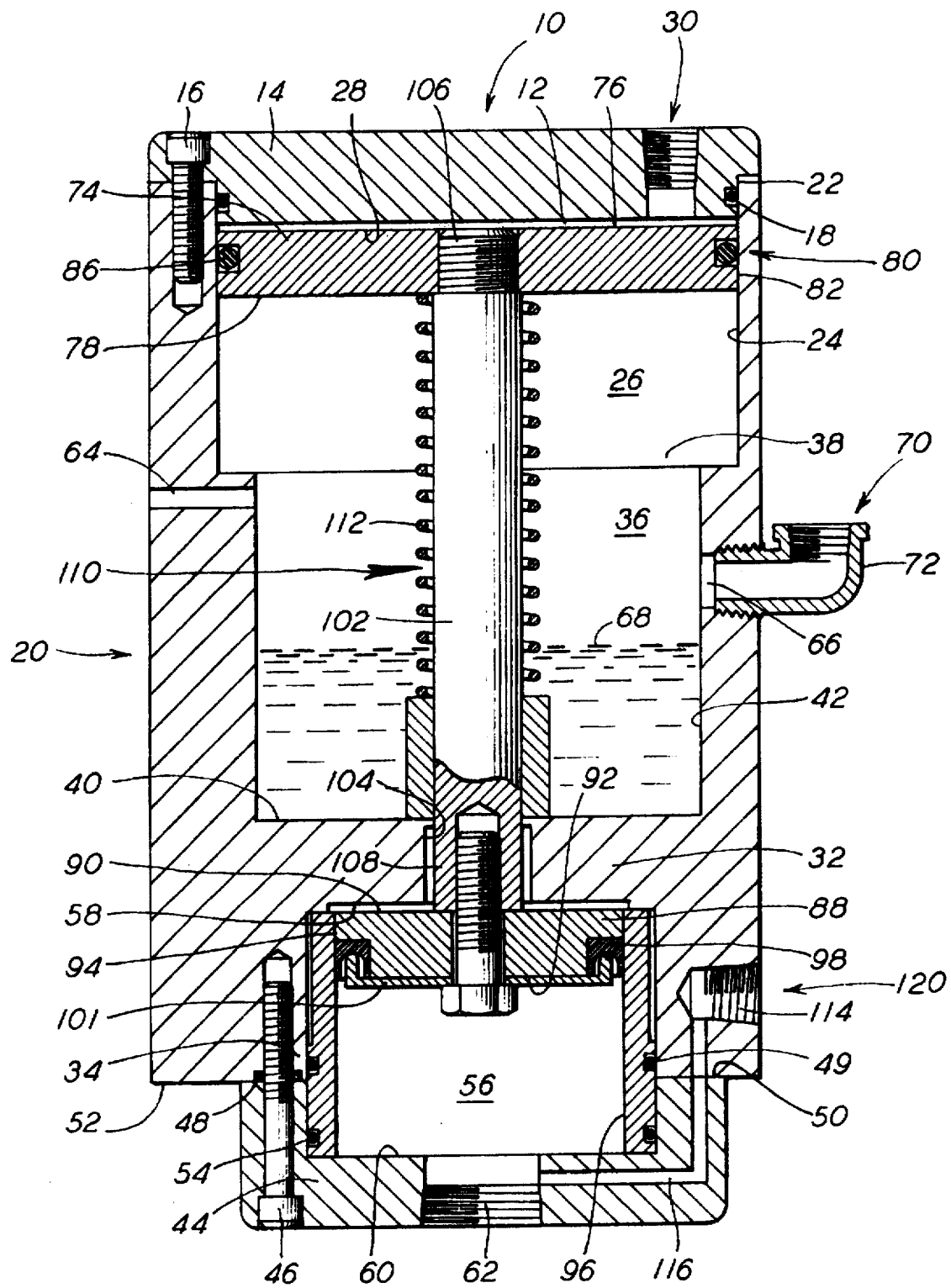

PNEUMATIC PRESSURE TO HYDRAULIC PRESSURE INTENSIFIER MECHANISM

CROSS REFERENCE TO RELATED APPLICATIONS

The invention taught in this patent application is related to two earlier filed and co-pending patent applications titled, "RAILWAY VEHICLE BRAKE SYSTEM", filed on Jun. 14, 1997 and assigned Ser. No. 08/664,392 and "PNEUMATIC PRESSURE OPERATED PARKING BRAKE FOR A RAILWAY VEHICLE BRAKE SYSTEM", filed on Jun. 14, 1997 and assigned Ser. No. 08/664,391. Each of these co-pending patent applications is assigned to the assignee of the present invention. In addition, the teachings in each of the above cross referenced patent applications is incorporated herein by reference thereto.

FIELD OF THE INVENTION

The present invention relates to fluid pressure devices and, more particularly, this invention relates to an improved type pneumatic pressure to hydraulic pressure intensifier mechanism which receives a predetermined pneumatic pressure as an input pressure in a first chamber and then communicates a higher predetermined hydraulic pressure as an output pressure to a predetermined apparatus which is operated by such hydraulic pressure and, still more particularly, this invention relates to the effective use of this improved type pneumatic pressure to hydraulic pressure intensifier mechanism in a number of unique railroad type applications, such as in a new type parking brake system presently being developed at the request of the Association of American Railroads (AAR).

BACKGROUND OF THE INVENTION

Prior to the conception and subsequent development of the present invention, pressure intensifiers have generally been known and used in certain applications. Nevertheless, to the best of applicant's knowledge a pressure intensifier as disclosed in the present application and which is particularly suitable for use in railway braking applications is not presently available as a commercial product.

A possible reason for this is that such pneumatic pressure to hydraulic pressure intensifiers have not been used in such railway braking applications, prior to the present invention, because these railway vehicle parking brakes have always been hand brakes that are connected to the brake rigging on such vehicles.

As is generally well known in the railway industry these hand brakes have been a source of problems. This is particularly the case when such hand brakes are not released when a train consist is ready to move over the tracks. Failure to release the hand brakes will result in excessive wear on both the wheels and rails.

SUMMARY OF THE INVENTION

The present invention provides a new and improved pneumatic pressure to hydraulic pressure intensifier mechanism. This new and improved intensifier mechanism includes a housing member which is open adjacent at least a first end thereof. The housing member includes a first end cap member secured to such open first end of the housing member in a substantially fluid tight manner. A first chamber, having a first predetermined volume, is disposed in this housing member adjacent the open first end thereof for receiving pneumatic pressure therein. This first chamber is defined by an inner surface of such first end cap member and an inner surface of the housing member. There is a first fluid connection and communication means formed through the first end cap member for connecting a source of pneumatic pressure to such first end cap means and for communicating this pneumatic pressure to such first chamber. A wall-like member is disposed in the housing member at one of a position that is located adjacent a radially opposed second end of such housing member and a position located intermediate the open first end and a radially opposed open second end of the housing member. A second chamber, having a second predetermined volume, is disposed in the housing member. This second chamber is located such that it is in fluid communication with the first chamber adjacent one end thereof. The second chamber contains each of a predetermined volume of hydraulic fluid and a predetermined volume of unpressurized air therein. Such second chamber is defined by a first surface of the wall-like member and an inner surface of such housing member. There is also a second end cap member secured to this second end of such housing member in a substantially fluid tight manner. A third chamber, having a third predetermined volume, is disposed in at least one of such open second end of the housing member, the second end cap member and a first portion of such third chamber in the open second end of such housing member and a second portion of the third chamber in the second end cap member. This third chamber contains a predetermined volume of hydraulic fluid therein. Such third chamber is defined at least by a radially opposed second surface of such wall-like member and an inner surface of the second end cap member. A second fluid connection and communication means is formed through such second end cap means. Such second fluid connection and communication means connects the third chamber to a fluid communication line and enables the communication of such hydraulic fluid to the fluid communication line. There is a first aperture formed through a wall portion of the second chamber closely adjacent such first chamber to enable evacuation of unpressurized air from a first portion of the first chamber and a first portion of such second chamber during communication of such pneumatic pressure to a second portion of the first chamber and to enable the communication of unpressurized air into such first portion of the first chamber and the first portion of such second chamber upon the evacuation of such pneumatic pressure from the second portion of such first chamber. In addition, the housing member includes a second aperture formed through another wall portion thereof. This second aperture is located in a position below the first aperture and closely adjacent an upper surface of such predetermined volume of such hydraulic fluid contained in the second chamber to facilitate communication of such predetermined volume of such hydraulic fluid to such second chamber as it becomes necessary. There is a first disc-like piston member disposed for reciprocal movement within the first chamber. An upper surface of the first disc-like piston member faces such inner surface of the first end cap member and a radially opposed bottom surface of such first disc-like piston member is positioned such that it faces the first surface of the wall member. A first sealing means is disposed around a peripheral portion of the first disc-like piston member. This first sealing means seals the peripheral portion of the first disc-like piston member against an inner wall surface of such first chamber in order to retain such pneumatic pressure, during communication thereof to such first chamber, within such first chamber and thereby cause the first disc-like piston member to move in a downward direction. Additionally, there is a second disc-like piston member disposed for reciprocal movement within such third chamber. An upper surface of the second disc-like piston member faces the radially opposed second surface of such wall-like member and a radially opposed second surface of second disc-like piston member is positioned such that it faces the inner surface of such second end cap member. A second sealing means is disposed around a peripheral portion of this second disc-like piston member in order to seal the peripheral portion of such second disc-like piston member against an inner wall surface of the third chamber to thereby enable communication of such hydraulic fluid to such fluid communication line during a downward movement of such second disc-like piston member. This intensifier mechanism further includes an elongated rod-like means which extends through a centrally disposed aperture formed through such wall-like member and is connected at a first end thereof to the first disc-like piston member and at an axially opposed second end thereof to the second disc-like piston member for causing such downward movement of the second disc-like piston member during such communication of such pneumatic pressure to the first chamber. An urging means is disposed around such elongated rod-like means. The urging means is caged between the radially opposed bottom surface of such first disc-like piston member and the first surface of such wall-like member for moving the first disc-like piston member in a direction toward the inner surface of such first end cap member when such pneumatic pressure communicated to the first chamber in such housing member is evacuated therefrom.

OBJECTS OF THE INVENTION

It is, therefore, one of the primary objects of the present invention to provide a pneumatic pressure to hydraulic pressure intensifier mechanism which will enable a significant increase of an output hydraulic pressure over an input pneumatic pressure to be achieved.

Another object of the present invention is to provide a pneumatic pressure to hydraulic pressure intensifier mechanism which is relatively inexpensive to produce.

Still another object of the present invention is to provide a pneumatic pressure to hydraulic pressure intensifier mechanism which is relatively maintenance free.

Yet still another object of the present invention is to provide a pneumatic pressure to hydraulic pressure intensifier mechanism which is easy to install.

A further object of the present invention is to provide a pneumatic pressure to hydraulic pressure intensifier mechanism which can be used effectively in a number of different force transmitting type applications.

An additional object of the present invention is to provide a pneumatic pressure to hydraulic pressure intensifier mechanism which can be readily retrofitted into existing equipment.

Another object of the present invention is to provide a pneumatic pressure to hydraulic pressure intensifier mechanism which exhibit a relatively long useful life in its intended application.

Still yet another object of the present invention is to provide a pneumatic pressure to hydraulic pressure intensifier mechanism which can be manufactured in a number of different sizes to provide the necessary predetermined output pressure intensification depending upon the end application for such intensifier mechanism.

In addition to the several specific objects and advantages of the present invention which have been described with some particularity above, various additional objects and advantages of the pneumatic pressure to hydraulic pressure intensifier mechanism will become much more readily apparent to those persons who are skilled in the relevant fluid pressure communication art from the following more detailed description of the invention, particularly, when such description is taken in conjunction with the attached drawing and with the appended claims.

BRIEF DESCRIPTION OF THE DRAWING

FIG. 1 is a side elevation view, partially in cross section, of the presently preferred embodiment of the pneumatic pressure to hydraulic pressure intensifier mechanism produced according to the invention.

BRIEF DESCRIPTION OF THE PRESENTLY PREFERRED AND VARIOUS ALTERNATIVE EMBODIMENTS OF THE INVENTION

Reference is now directed, more particularly, to FIG. 1 of the attached drawing. Illustrated in FIG. 1 is the presently preferred embodiment of an improved pneumatic pressure to hydraulic pressure type intensifier mechanism, generally designated 10, which can be readily adapted for use in many different applications.

Such pneumatic pressure to hydraulic pressure type intensifier mechanism 10 includes a housing member, generally designated 20. Such housing member 20 is open adjacent at least a first end 12 thereof. The housing member 20 includes a first end cap member 14 which is secured to such at least open first end 12 of the housing member 20 in a substantially fluid tight manner. Preferably, the first end cap member 14 is secured to the housing member 20 in a removable manner, such as by bolt 16, to facilitate any required maintenance and/or to gain access to the interior portion of such housing member 20. In order to ensure that such first end cap member 14 is secured in a fluid tight manner to such housing member 20, there is an O-ring type sealing member 18 disposed between a peripheral portion 22 of such first end cap member 14 and an inner surface 24 of such housing member 20 adjacent the at least open first end 12.

A first chamber 26, having a first predetermined volume, is disposed in the housing member 20 adjacent such at least open first end 12 thereof. This first chamber 26 receives therein a predetermined pneumatic pressure. Such first chamber 26 is defined by an inner surface 28 of the first end cap member 14 and the inner surface 24 of such housing member 20. It can be seen, in FIG. 1, that the first chamber 26 is substantially open at a location disposed radially opposite such inner surface 28 of the first end cap member 14.

There is provided a first fluid connection and communication means 30. This first fluid connection and communication means 30 is formed through the first end cap member 14 in order to connect a source of pneumatic pressure to the first end cap member 14 and to communicate such pneumatic pressure to the first chamber 26 as it is required. In the presently preferred embodiment, of the invention, the first fluid connection and communication means 30 will be a threaded aperture which threadedly connects a pneumatic pressure communication line (not shown) to the first end cap member 14.

A wall-like member 32 is provided in such housing member 20. The wall-like member 32 may by, for example only, located at a position adjacent a radially opposed second end 34 of the housing member 20. Preferably, however, such wall-like member 32 will be located at a position located intermediate the at least open first end 12 and the radially opposed open second end 34 of such housing member 20.

There is a second chamber 36, having a second predetermined volume, disposed in the housing member 20. The second chamber 36 is in fluid communication with the first chamber 26 adjacent an open one end 38 thereof. The second chamber 36 will normally contain therein each of a predetermined volume of hydraulic fluid and a predetermined volume of air at atmospheric pressure. Such second chamber 36 being defined by a first surface 40 of the wall-like member 32 and an inner surface 42 of such housing member 20.

A second end cap member 44 is secured to the second end 34 of such housing member 20 in a substantially fluid tight manner. Preferably, the second end cap member 44 will be secured to the housing member 20 in a removable manner, such as by bolt 46, to facilitate any required maintenance and/or to gain access to the interior portion of such housing member 20. In order to ensure that such second end cap member 44 is secured in a fluid tight manner to such housing member 20, there is at least one O-ring type sealing member 48 disposed between a portion 50 of such second end cap member 44 and a surface 52 disposed on such housing member 20 adjacent the second end 34.

It is presently preferred, as it has been illustrated in the drawing, that a liner member 53 will be provided and that there will be two O-ring type sealing members 49 and 54 provided.

Also provided is a third chamber 56. The third chamber 56 has a third predetermined volume. Although the third chamber 56 may be disposed entirely within either the open second end 34 of such housing member 20 or within the second end cap member 44, it is presently preferred that at least a first portion of the third chamber 56 will be disposed in the open second end 34 of such housing member 20 and a second portion of such third chamber 56 will be disposed in the second end cap member 44. The third chamber 56 contains a predetermined volume of hydraulic fluid therein. Such third chamber 56 being defined at least by a radially opposed second surface 58 of the wall-like member 32 and an inner surface 60 of the second end cap member 44. Inner surface 60 of the second end cap member 44 faces such radially opposed second surface 58 of such wall-like member 32.

A second fluid connection and communication means 62 is formed through such second end cap member 44. Such second fluid connection and communication means 62 is provided to connect the third chamber 56 to a fluid communication line (not shown) and to enable the communication of such hydraulic fluid to such fluid communication line. In the presently preferred embodiment, of the invention, the second fluid connection and communication means 62 will be a threaded aperture which threadedly connects the fluid communication line to the second end cap member 44.

A first aperture 64 is formed through a wall portion of the second chamber 36 located closely adjacent such first chamber 26. This first aperture 64 enables the evacuation of air at atmospheric pressure from a first portion of the first chamber 26 and a first portion of such second chamber 36, during the time when communication of such pneumatic pressure to a second portion of the first chamber 26 is in progress. The first aperture 64 further enables communication of air at atmospheric pressure into the first portion of such first chamber 26 and the first portion of such second chamber 36 during the time that evacuation of such pneumatic pressure from the second portion of such first chamber 26 is in progress. In the presently preferred embodiment of the invention, such first aperture 64 will be generally round and will include a filter medium (not shown) disposed therein in order to prevent entrance of any undesirable foreign matter into such second chamber 36, during the communication of air at atmospheric pressure, into the first portion of such first chamber 26 and the first portion of such second chamber 36.

The housing member 20 further includes a second aperture 66 which is formed through another wall portion thereof. Such second aperture 66 is disposed at a location below the first aperture 64 and closely adjacent an upper surface 68 of such predetermined volume of hydraulic fluid contained within the second chamber 36. This second aperture 66 is provided to enable the communication of such predetermined volume of hydraulic fluid to such second chamber 36 as necessary.

In the presently most preferred embodiment of such pneumatic pressure to hydraulic pressure intensifier mechanism 10, a means, generally designated 70, is connected to the second aperture 66 to facilitate the communication of such hydraulic fluid thereto. As it has been illustrated in the drawing, such means 70 for communicating the hydraulic fluid to such second aperture 66 is an elbow-like member 72. Preferably, a threaded plug member (not shown) will be threadedly engaged with such elbow-like member 72 in order to close it after the communication of the predetermined volume of hydraulic fluid to the second chamber 36 has been completed and thereby prevent the entrance of any undesirable foreign matter into the second chamber 36.

Additionally, such pneumatic pressure to hydraulic pressure intensifier mechanism 10 includes a first disc-like piston type member 74 which is disposed for reciprocal movement within such first chamber 26. An upper surface 76 of such first disc-like piston type member 74 faces the inner surface 28 of such first end cap member 14 and a radially opposed bottom surface 78 of such first disc-like piston type member 74 is disposed facing such first surface 40 of the wall-like member 32.

According to the present invention, there is provided a first sealing means, generally designated 80, which is disposed around a peripheral portion 82 of the first disc-like piston type member 74. The first sealing means 80 seals the peripheral portion 82 of such first disc-like piston type member 74 against the inner wall surface 24 of the first chamber 26 to retain such pneumatic pressure, during communication thereof to such first chamber 26, within the first chamber 26 and thereby cause the first disc-like piston type member 74 to move in a downwardly direction. In the presently most preferred embodiment, the first sealing means 80 is an O-ring 86.

Such pneumatic pressure to hydraulic pressure intensifier mechanism 10 has a second disc-like piston type member 88. This second disc-like piston type member 88 is disposed for reciprocal movement within the third chamber 56. An upper surface 90 of the second disc-like piston type member 88 faces the radially opposed second surface 58 of such wall-like member 32 and a radially opposed second surface 92 of the second disc-like piston type member 88 faces the inner surface 60 of such second end cap member 44.

There is a second sealing means, generally designated 100, disposed around a peripheral portion 94 of the second disc-like piston type member 88. Such second sealing means 100 is provided to seal the peripheral portion 94 of the second disc-like piston type member 88 against an inner wall surface 96 of the liner member 53 disposed in such third chamber 56 and thereby enable communication of such hydraulic fluid to such fluid communication line during a downward movement of the second disc-like piston type member 88. In the presently most preferred embodiment of the invention, the second sealing means 100 is a generally round U-shaped ring 98 held in place by plate member 101.

Further, an elongated rod-like member 102 is provided which extends through a centrally disposed aperture 104 formed through such wall-like member 32. The elongated rod-like member 102 is connected at a first end 106 thereof to such first disc-like piston type member 74 and at an axially opposed second end 108 thereof to the second disc-like piston type member 88. Such elongated rod-like member 102 causes the downward movement of the second disc-like piston type member 88 during communication of such pneumatic pressure to the first chamber 26.

In a preferred embodiment of the invention at least one of such disc-like piston type members is secured to such elongated rod-like member 102 by a bolt and such other disc-like piston type member is secured to such elongated rod-like member 102 by a threaded connection. In another embodiment of the invention both disc-like piston type members are secured to such elongated rod-like member 102 by a bolt.

The final essential element of such pneumatic pressure to hydraulic pressure intensifier mechanism 10 is an urging means, generally designated 110. Urging means 110 is disposed around the elongated rod-like member 102. Also, the urging means 110 is caged between the radially opposed bottom surface 78 of such first disc-like piston type member 74 and the first surface 40 of such wall-like member 32 for moving the first disc-like piston type member 74 toward the inner surface 28 of such first end cap member 14 when such pneumatic pressure communicated to the first chamber 26 in such housing member 20 is evacuated therefrom. In the presently most preferred embodiment of the invention, such urging means 110 is a spring member 112.

Although not required, there is illustrated in the drawing one presently preferred fluid communication means, generally designated 120, for supplying hydraulic fluid to the third chamber 56 when necessary. Such fluid communication means 120 includes a threaded aperture 114 engageable with a source (not shown) of hydraulic fluid and a fluid communication line 116 in fluid communication with such third chamber 56 and the threaded aperture 114.

While a presently preferred embodiment and a number of other useful alternative embodiments of such improved pneumatic pressure to hydraulic pressure intensifier mechanism have been described in detail above, it should be obvious that various additional useful adaptations and modifications of the present invention can be made by those persons who are skilled in the fluid pressure application art without departing from either the spirit of the instant invention and/or the scope of the appended claims.

I claim:

1. A pneumatic pressure to hydraulic pressure intensifier mechanism, said intensifier mechanism comprising:
   (a) a housing member open adjacent at least a first end thereof, said housing member including;
      (i) a first end cap member secured to said at least open first end of said housing member in a substantially fluid tight manner,
      (ii) a first chamber, having a first predetermined volume, disposed in said housing member adjacent said at least open first end for receiving pneumatic pressure therein, said first chamber being defined by an inner surface of said first end cap member and an inner surface of said housing member,
      (iii) a first fluid connection and communication means formed through said first end cap member for connecting a source of pneumatic pressure to said first end cap member and for communicating such pneumatic pressure to said first chamber,
      (iv) a wall-like member disposed in said housing member at one of a position located adjacent a radially opposed open second end of said housing member and a position located intermediate said at least open first end and said radially opposed open second end of said housing member,
      (v) a second chamber, having a second predetermined volume, disposed in said housing member in fluid communication with said first chamber adjacent one end thereof for containing each of a predetermined volume of hydraulic fluid and a predetermined volume of unpressurized air therein, said second chamber being defined by a first surface of said wall-like member and an inner surface of said housing member,
      (vi) a second end cap member secured to said second end of said housing member in a substantially fluid tight manner,
      (vii) a third chamber, having a third predetermined volume, disposed in at least one of said open second end of said housing member, said second end cap member and a first portion of said third chamber in said open second end of said housing member and a second portion of said third chamber in said second end cap member, said third chamber containing a predetermined volume of hydraulic fluid therein, said third chamber being defined at least by a radially opposed second surface of said wall-like member and an inner surface of said second end cap member,
      (viii) a second fluid connection and communication means formed through said second end cap means for connecting said third chamber to a fluid communication line and enabling communication of such hydraulic fluid to such fluid communication line,
      (ix) a first aperture formed through a wall portion of said second chamber closely adjacent said first chamber to enable evacuation of unpressurized air from a first portion of said first chamber and a first portion of said second chamber during communication of such pneumatic pressure to a second portion of said first chamber and to enable communication of unpressurized air into said first portion of said first chamber and said first portion of said second chamber upon evacuation of such pneumatic pressure from said second portion of said first chamber, and
      (x) a second aperture formed through another wall portion of said housing member in a position below said first aperture and closely adjacent an upper surface of such predetermined volume of such hydraulic fluid contained in said second chamber to enable communication of such predetermined volume of such hydraulic fluid to such second chamber as necessary;
   (b) a first disc-like piston member disposed for reciprocal movement within said first chamber, an upper surface of said first disc-like piston member facing said inner surface of said first end cap member and a radially opposed bottom surface of said first disc-like piston member facing said first surface of said wall member;
   (c) a first sealing means disposed around a peripheral portion of said first disc-like piston member for sealing said peripheral portion of said first disc-like piston member against an inner wall surface of said first chamber to retain such pneumatic pressure, during communication thereof to such first chamber, within said first chamber and thereby cause said first disc-like piston member to move in a downward direction;

(d) a second disc-like piston member disposed for reciprocal movement within said third chamber, an upper surface of said second disc-like piston member facing said radially opposed second surface of said wall-like member and a radially opposed second surface of said second disc-like piston member facing said inner surface of said second end cap member;

(e) a second sealing means disposed around a peripheral portion of said second disc-like piston member for sealing said peripheral portion of said second disc-like piston member against an inner wall surface of said third chamber to thereby enable communication of such hydraulic fluid to such fluid communication line during a downward movement of said second disc-like piston member;

(f) an elongated rod-like means extending through a centrally disposed aperture formed through said wall-like member and connected at a first end thereof to said first disc-like piston member and at an axially opposed second end thereof to said second disc-like piston member for causing said downward movement of said second disc-like piston member during such communication of such pneumatic pressure to said first chamber; and (g) an urging means disposed around said elongated rod-like means and caged between said radially opposed bottom surface of said first disc-like piston member and said first surface of said wall-like member for moving said first disc-like piston member toward said inner surface of said first end cap member when such pneumatic pressure communicated to said first chamber in said housing member is evacuated therefrom.

2. A pneumatic pressure to hydraulic pressure intensifier mechanism, according to claim 1, wherein said pneumatic pressure to hydraulic pressure intensifier mechanism further includes a means connected to said second aperture for facilitating such communication of such hydraulic fluid to said second chamber disposed in said housing member.

3. A pneumatic pressure to hydraulic pressure intensifier mechanism, according to claim 2, wherein said means for facilitating such communication of such hydraulic fluid to said second chamber is an elbow-like member.

4. A pneumatic pressure to hydraulic pressure intensifier mechanism, according to claim 3, wherein means for facilitating such communication of such hydraulic fluid to said second chamber includes a threaded plug member threadedly engaged with said elbow-like member for closing said elbow-like member after such communication of such predetermined volume of hydraulic fluid to said second chamber has been completed and thereby prevent an entrance of any undesirable foreign matter into said second chamber.

5. A pneumatic pressure to hydraulic pressure intensifier mechanism, according to claim 1, wherein said first end cap member includes a sealing means disposed between a peripheral portion of said first end cap member and an inner surface of said housing member adjacent said at least open first end for ensuring that said first end cap member is secured in a fluid tight manner to said housing member.

6. A pneumatic pressure to hydraulic pressure intensifier mechanism, according to claim 5, wherein said sealing means disposed between said peripheral portion of said first end cap member and an inner surface of said housing member adjacent said at least open first end includes at least one O-ring type sealing member.

7. A pneumatic pressure to hydraulic pressure intensifier mechanism, according to claim 1, wherein said first fluid connection and communication means formed through said first end cap member for connecting a source of pneumatic pressure to said first end cap means and for communicating such pneumatic pressure to said first chamber includes a threaded aperture which threadedly connects a pneumatic pressure communication line to said first end cap member (14).

8. A pneumatic pressure to hydraulic pressure intensifier mechanism, according to claim 1, wherein said second end cap member includes a sealing means disposed between a peripheral portion of said second end cap member and an inner surface of said housing member adjacent said second end of said housing member for ensuring that said second end cap member is secured in a fluid tight manner to said housing member.

9. A pneumatic pressure to hydraulic pressure intensifier mechanism, according to claim 8, wherein said sealing means disposed between a peripheral portion of said second end cap member and an inner surface of said housing member adjacent said second end of said housing member includes at least one O-ring type sealing member.

10. A pneumatic pressure to hydraulic pressure intensifier mechanism, according to claim 9, wherein said sealing means disposed between a peripheral portion of said second end cap member and an inner surface of said housing member adjacent said second end of said housing member includes at least two O-ring type sealing members.

11. A pneumatic pressure to hydraulic pressure intensifier mechanism, according to claim 1, wherein said first sealing means disposed around said peripheral portion of said first disc-like piston member includes at least one O-ring type sealing member.

12. A pneumatic pressure to hydraulic pressure intensifier mechanism, according to claim 1, wherein said second sealing means disposed around said peripheral portion of said second disc-like piston type member includes at least one O-ring type sealing member.

13. A pneumatic pressure to hydraulic pressure intensifier mechanism, according to claim 1, wherein said urging means disposed around said elongated rod-like means and caged between said radially opposed bottom surface of said first disc-like piston member and said first surface of said wall-like member for moving said first disc-like piston member toward said inner surface of said first end cap member when such pneumatic pressure communicated to said first chamber in said housing member is evacuated therefrom is a spring member.

14. A pneumatic pressure to hydraulic pressure intensifier mechanism, according to claim 1, wherein at least one of said first disc-like piston type member and said second disc-like piston type member is secured to said elongated rod-like member by a bolt.

15. A pneumatic pressure to hydraulic pressure intensifier mechanism, according to claim 1, wherein each one of said first disc-like piston type member and said second disc-like piston type member is secured to said elongated rod-like member by a bolt.

16. A pneumatic pressure to hydraulic pressure intensifier mechanism, according to claim 1, wherein a predetermined one of said first disc-like piston type member and said second disc-like piston type member is secured to said elongated rod-like member by a bolt and an opposite one of said first disc-like piston type member and said second disc-like piston type member is secured to said elongated rod-like member by a threaded connection.

17. A pneumatic pressure to hydraulic pressure intensifier mechanism, according to claim 1, wherein said first end cap member secured to said at least open first end of said housing member in a substantially fluid tight manner is removable and said housing member further includes a means engagable with each of said first end cap means and said housing member for securing said first end cap member to said housing member.

18. A pneumatic pressure to hydraulic pressure intensifier mechanism, according to claim 17, wherein said means engagable with each of said first end cap means and said housing member for securing said first end cap member to said housing member is at least one bolt.

19. A pneumatic pressure to hydraulic pressure intensifier mechanism, according to claim 1, wherein said second end cap member secured to said second end of said housing member in a substantially fluid tight manner is removable and said housing member further includes a means engagable with each of said second end cap means and said housing member for securing said second end cap member to said housing member.

20. A pneumatic pressure to hydraulic pressure intensifier mechanism, according to claim 19, said means engagable with each of said second end cap means and said housing member for securing said second end cap member to said housing member is at least one bolt.

* * * * *